US010465809B2

(12) United States Patent
Landi (10) Patent No.: US 10,465,809 B2
(45) Date of Patent: Nov. 5, 2019

(54) VALVE ASSEMBLY FOR EXPANDABLE BLADDER AND METHOD OF MANUFACTURING THE SAME

(71) Applicant: NSI INTERNATIONAL, INC., New York, NY (US)

(72) Inventor: Frank Landi, New York, NY (US)

(73) Assignee: NSI INTERNATIONAL, INC., New York, NY (US)

(*) Notice: Subject to any disclaimer, the term of this patent is extended or adjusted under 35 U.S.C. 154(b) by 31 days.

(21) Appl. No.: 15/589,132

(22) Filed: May 8, 2017

(65) Prior Publication Data

US 2018/0142795 A1    May 24, 2018
US 2019/0085992 A9    Mar. 21, 2019

Related U.S. Application Data

(63) Continuation-in-part of application No. 14/416,089, filed as application No. PCT/US2014/017819 on Feb. 21, 2014.

(Continued)

(51) Int. Cl.
*F16K 15/20*    (2006.01)
*B60C 29/04*    (2006.01)

(52) U.S. Cl.
CPC ............ *F16K 15/20* (2013.01); *B60C 29/04* (2013.01); *Y10T 137/7882* (2015.04)

(58) Field of Classification Search
CPC ......... Y10T 137/7882; Y10T 137/3584; Y10T 137/36; Y10T 137/3631; Y10T 137/3724; F16K 15/20; B60C 29/04

(Continued)

(56) References Cited

U.S. PATENT DOCUMENTS

| 657,007 A | * | 8/1900 | Richter | ................... F16K 15/20 |
| | | | | 137/232 |
| 1,596,320 A | * | 8/1926 | Sonnett | ................. F16K 15/202 |
| | | | | 137/223 |

(Continued)

FOREIGN PATENT DOCUMENTS

| CA | 2411265 | | 6/2001 | | |
| CA | 2755422 A1 | * | 9/2010 | ........... | F16K 15/147 |

(Continued)

OTHER PUBLICATIONS

PCT/US2014/017819, Search Report and Written Opinion dated May 20, 2014, 10 pags—English.

(Continued)

*Primary Examiner* — Jessica Cahill
(74) *Attorney, Agent, or Firm* — Andrew F. Young, Esq.; Lackenbach Siegel, LLP (57) ABSTRACT

The present invention relates to expandable bodies or systems with bounding walls or bladder structures and at least one valve assembly thermally bonded thereto. More particularly, the present invention provides a fluid valve assembly for expandable fluid-containing bodies typically made from a thermoplastic rubber material or the like, which will exhibit significantly increased strength and durability during expansion and while expanded, especially at and around the interface between the fluid valve assembly and the bounding wall of the expandable body because of the enhanced strength of the fluid valve assembly interface through thermal sealing.

9 Claims, 9 Drawing Sheets

Related U.S. Application Data (60) Provisional application No. 62/424,520, filed on Nov. 20, 2016, provisional application No. 61/768,280, filed on Feb. 22, 2013.

(58) Field of Classification Search
USPC .......................................... 137/511–526, 846
See application file for complete search history.

(56) References Cited

U.S. PATENT DOCUMENTS

| | | | | |
|---|---|---|---|---|
| 1,702,974 | A * | 2/1929 | MacDonald | F16K 15/202 116/DIG. 9 |
| 1,951,565 | A * | 3/1934 | Sonnett | F16K 15/202 137/223 |
| 1,990,374 | A * | 2/1935 | Goldsmith | F16K 15/202 137/223 |
| 2,134,634 | A * | 10/1938 | Goldsmith | F16K 15/202 473/611 |
| 3,905,387 | A | 9/1975 | Grant | |
| 4,178,653 | A | 12/1979 | Cost, Jr. | |
| 4,263,682 | A | 4/1981 | Bejarano | |
| 4,865,171 | A * | 9/1989 | Miller | B60T 11/30 188/352 |
| 5,133,324 | A * | 7/1992 | Michiaki | F02M 37/025 123/510 |
| 5,144,708 | A * | 9/1992 | Pekar | F16K 15/202 137/223 |
| 5,330,437 | A * | 7/1994 | Durman | A61M 39/06 137/846 |
| 5,881,772 | A * | 3/1999 | Bennett | F16K 15/147 137/843 |
| 5,915,407 | A * | 6/1999 | West | F16K 15/202 137/223 |
| 6,305,420 | B1 * | 10/2001 | Atkinson | F01M 1/16 123/196 R |
| 7,749,254 | B2 * | 7/2010 | Sobelman | A61F 5/003 606/256 |
| 8,292,764 | B2 * | 10/2012 | Steidle | A63B 41/085 473/610 |
| 2003/0201023 | A1 * | 10/2003 | Barinaga | F16K 15/147 137/846 |
| 2008/0295898 | A1 * | 12/2008 | Leppert | F02M 37/0029 137/497 |
| 2014/0276453 | A1 * | 9/2014 | Woehr | A61M 25/0618 604/246 |
| 2015/0192212 | A1 * | 7/2015 | Landi, Jr. | B29C 49/4252 137/223 |
| 2016/0244708 | A1 * | 8/2016 | Jaeger | C12M 23/38 |

FOREIGN PATENT DOCUMENTS

| | | | |
|---|---|---|---|
| FR | 688098 | 11/1929 | |
| FR | 9615052 | 12/1996 | |
| GB | 2190466 A * | 11/1987 | ........... F16K 15/147 |
| JP | 63270980 A * | 11/1988 | |
| JP | 2010-155071 | 7/2010 | |
| WO | WO 01/95982 | 12/2001 | |
| WO | WO 2014/130885 | 8/2014 | |

OTHER PUBLICATIONS

U.S. Appl. No. 14/416,089, Office Action dated Dec. 12, 2017, 15 pages.

* cited by examiner

VALVE ASSEMBLY FOR EXPANDABLE BLADDER AND METHOD OF MANUFACTURING THE SAME

CROSS REFERENCE TO RELATED APPLICATIONS

This application relates to and claims priority from U.S. Ser. No. 62/424,520 filed Nov. 20, 2016, the entire contents of which are incorporated herein by reference.

BACKGROUND OF THE INVENTION

Field of the Invention

The present invention relates to expandable bodies or systems with bounding walls or fluid containing bladder structures and at least one fluid valve assembly. More particularly, the present invention provides a fluid valve assembly for expandable bodies typically made from thermoplastic rubber material and the like which will exhibit significantly increased strength and durability during fluid expansion and while expanded especially at and around the interface between the fluid valve assembly and the bounding wall of the expandable body.

Description of the Related Art

The prior art is directed to methods and apparatus for flexible air valves for use in inflatable bodies including, for example, balloons, sports balls, toys, exercise balls or equipment, inflatable boats, inflatable castles or other structures, and the like. Such inflatable products are typically fashioned from thin flexible polymer materials. As the strength of flexible polymer materials has improved over the years, inflatable product sizes have also increased. Inflatable items having small diameters have grown to large diameter inflatable structures or bodies. Much less common are expandable bodies receiving volumetric contents other than air, for example a fluid such as a water-balloon, which has no valve at all and is hand-tied as a seal with a physical clip or restraining mechanism.

Conventionally, an insertion of air into the inflatable body is typically accomplished by the use of a manual or electric air pump. The air pressure generated by the air pump is delivered to the inflatable body via an air hose. The air pump hose typically has a diameter larger than the inside diameter dimension of the opening of the air valve fitted in the inflatable body. In order to interface the hose from the air pump to the inflation air valve, a needle or other reducer is typically employed. Such a needle or other adapter or reducer is normally fitted on the end of the air hose and used for all inflatable bodies. The needle/adapter enables a standard size air hose extending from the air pump to be force-fitted into the air valve for filling the inflatable body with air.

However, the effectiveness of a conventional water supply is not effectively provided through a reducer due to the non-compressible nature of fluid. As a result, typically, there is no particular fluid-inflation-mechanism that would be used. Of course, generally, the larger the inside diameter dimension of a fluid hose or faucet opening prevents direct use with an expandable bladder in any case. Typically a user must hand-stretch a water-balloon mouth over a hose opening or faucet opening and then pinch off the end and hand-tie the end.

Various kinds of air valves and air valve assemblies have been developed for inflating gas-based (air) bladders, balloons, sports balls, or the like, and generally comprise a plug made of compressible material (such as hard rubber on a basket ball) and having a needle passageway arranged for allowing a needle to pass through it and to expand towards itself to completely close when the needle is removed from the plug, and to ensure that pressurized air within the bladder cannot escape through the air valve. Typically such conventional air-valves are formed in an already-closed manner.

For example, one such air valve is disclosed for use in a sportsball such as a soccer ball or volleyball to provide good air retention and durability. Such a valve, however, is preferably permanently sealed to the particular bladder, and is formed from a thermoplastic polyurethane elastomer similar to that used in the inner core. The air valve has a cylindrical-shaped body with a sealing flange, an air passage neck and a snap-in retaining flange. The body of the valve has a chamber within its central area in which a rubber pellet is placed to seal the interior of the bladder from the atmosphere and prevent the air used for inflation of the ball from escaping. The polyurethane valve is preferred due to the fact it will permanently bond with the wall of the inner core to ensure its full retention without an air leaking problem. Optimum bonding results from an inner core and an air valve made of the same thermoplastic material. However, the plug which is made of compressible material may fail after use. In addition, the air valve has no protective structure to absorb a force from the inflating needle. Ultimately, there are no recognized fluid valves for use conventionally known in the art that would allow the use in combination with an expandable bladder.

Bladders or bounding walls of inflatable bodies are conventionally made of rubber, latex, nylon, vinyl, polychloroprene, synthetic fabric, synthetic rubber, natural rubber, and the like. Other flexible materials for use in inflatable bodies include thermoplastic elastomers (TPE), otherwise known as thermoplastic rubbers (TPR), which are a class of copolymers or a physical mix of polymers (usually a plastic and a rubber) consisting of materials with both thermoplastic and elastomeric properties. While most elastomers are thermosets, thermoplastics are in contrast relatively easy to use in manufacturing, for example, by injection molding. Thermoplastic elastomers show advantages typical of both rubbery materials and plastic materials. The principal difference between thermoset elastomers and thermoplastic elastomers is the type of crosslinking bond in their structures. In fact, crosslinking is a critical structural factor which contributes to impart high elastic properties. The crosslink in thermoset polymers is a covalent bond created during the vulcanization process. On the other hand, the crosslink in thermoplastic elastomer polymers is a weaker dipole or hydrogen bond or takes place in one of the phases of the material.

There are six generic classes of commercial TPEs/TPRs: Styrenic block copolymers; Polyolefin blends; Elastomeric alloys (TPE-v or TPV); Thermoplastic polyurethanes; Thermoplastic copolyester, and Thermoplastic polyamides. Examples of TPE/TPR products that come from block copolymers group are Arnitel (DSM), Engage (Dow Chemical), Hytrel (Du Pont), Dryflex and Mediprene (ELASTO), Kraton (Shell chemical division), and Dynalloy (Polyone Corporation). In order to qualify as a thermoplastic elastomer, a material must have the following three essential characteristics: (i) demonstrate the ability to be stretched to moderate elongations and, upon the removal of stress, return to something close to its original shape; (ii) be processable as a melt at elevated temperature; and (iii) exhibit the absence of significant creep. Some of the properties of TPE/TPR materials generally include: light weight; colorability; high tear strength; excellent abrasion resistance; excellent dimension stability; low temperature flexible; excellent weather resistance; performance like vulcanized rubber, reusable and recyclable; non-migratory; and excellent electrical properties.

Advantageously, TPE/TPR materials have the potential to be recyclable since they can be molded, extruded and reused like plastics, but they have typical elastic properties of rubbers which are not recyclable owing to their thermosetting characteristics. TPE/TPR materials also require little or no compounding, with no need to add reinforcing agents, stabilizers or cure systems. Therefore, batch-to-batch variations in weighting and metering components are absent, leading to improved consistency in both raw materials and fabricated articles. TPEs/TPRs can be easily colored by most types of dyes. In addition, TPEs/TPRs consume less energy and allow closer and more economical control of product quality during manufacture.

On the other hand, TPEs/TPRs, relative to conventional rubber or thermoset, require relatively more expensive raw materials, are generally unable to be loaded with low cost fillers, such as carbon black (therefore preventing TPEs from being used in automobile tires), have poor chemical and heat resistance, and have high compression set and low thermal stability. Also, TPEs/TPRs may soften or melt at elevated temperatures above which they lose their rubbery behaviour.

The two most important manufacturing methods with TPEs/TPRs are extrusion and injection molding. Compression molding is seldom, if ever, used. Fabrication via injection molding is extremely rapid and highly economical. Both the equipment and methods normally used for the extrusion or injection molding of a conventional thermoplastic are generally suitable for TPEs/TPRs. TPEs/TPRs can also be processed by blow molding, thermoforming, and heat welding.

TPEs/TPRs may be used where conventional elastomers cannot provide the range of physical properties needed in the product. These materials find large application in the automotive sector and in household appliances sector. Thus, co-polyester TPEs/TPRs are used in snowmobile tracks where stiffness and abrasion resistance is at a premium. They are also widely used for catheters where nylon block copolymers offer a range of softness ideal for patients. Thermoplastic silicon and olefin blends are used for extrusion of glass run and dynamic weatherstripping car profiles. Styrene block copolymers are used in shoe soles for their ease of processing, and widely as adhesives. TPEs/TPRs are commonly used to make suspension bushings for automotive performance applications because of its greater resistance to deformation when compared to regular rubber bushings. TPEs/TPRs may also be used in products meant for bodily insertion, and are also finding more and more use as electrical cable jacket/inner insulation.

Other applications of TPEs/TPRs include the footwear industry (for example, in the production of shoes soles, loafers sole, safety shoes sole & industrial shoes sole, sports shoes sole, ski-boot soles, kiddy shoes sole and related decorative accessories, unisole. modifier asphalt, modification modifier for SMC (sheet moulding compound) and other thermoset & thermoplastic composites), the automotive, sports and leisure industries (for example, in profiles, gaskets, lip-seals, tubings, pipes, co-extrusion automotive gasket, o-ring, bushings, bellows, floor mat, protecting covers, automotive grip, food & medical, ball pen grip, tooth brush grip, umbrella handle grip, milk tubing, disposable medical product, beverages), and the electrical and electronics industry (for example, in manufacturing welding cable, jacketing, flexible cord, primary wire, fire retardant control cable).

Synoprene Polymers Pvt. Ltd., one manufacturer of TPE/TPR materials, offers quality thermoplastic rubber, which is a part of Styrene Elastomer family that displays rubber like properties having styrenic based segment to achieve excellent strength. Besides conventional vulcanized rubber, it delivers superior properties to make replacement application of rubber and soft plastic in the sense of processing and end uses. A compounding ability makes TPR as a homogeneous composition to achieve excellent quality and processability. This Synoprene® TPR is based on styrenic as hard segment & soft phase consists of rubbery butadiene center and crystalline styrene at ends. It can combine well with many other elastomers, extenders, modifiers and other resins. All these combinations can be controlled to vary properties such as tack stiffness, softening temperatures and cohesive strengths according to the needs of specific and general usage. It is being widely accepted due to its various ranges in cost effective and value engineered concepts.

The present invention recognizes the need for an improved fluid valve assembly for highly durable expandable bodies typically made from TPE/TPR material and the like which will exhibit significantly increased strength and durability during and after expansion, especially at and around the interface between the fluid valve assembly and the bounding wall of the expandable body. The present invention has arisen to mitigate and/or obviate the aforementioned disadvantages of the conventional valves.

SUMMARY OF THE INVENTION

The primary objective of the present invention is to provide an improved fluid valve assembly for expandable bodies typically made from thermoplastic rubber material and the like which will exhibit significantly increased strength and durability during inflation and while inflated, especially at and around the interface between the valve assembly and the bounding wall of the inflatable body while providing secure closure of the fluid valve.

In accordance with one aspect of the invention, there is provided for expandable bodies or systems with bounding walls or bladder structures least one valve assembly thermally bonded thereto. More particularly, the present invention provides a fluid valve assembly for expandable fluid-containing bodies typically made from a thermoplastic rubber material or the like, which will exhibit significantly increased strength and durability during expansion and while expanded, especially at and around the interface between the fluid valve assembly and the bounding wall of the expandable body because of the enhanced strength of the fluid valve assembly interface through thermal sealing.

It is additionally understood that an fluid valve assembly for attachment to an expandable thermoplastic rubber bladder or bounding wall structure, the fluid valve assembly comprising a valve member having a flange extending radially therefrom, the valve member including an inner bore formed therein as a slot valve extending therefrom with a central opening communicating with the bore of the valve member. The opening of the slot valve has an inner dimension such that fluid may not flow in a reverse direction therethrough in because opposing extending side walls are sealingly press fit theretogether. The valve member further comprises an integrally formed lip-and-inlet contour around the bore of the valve member and the slot member providing added strength and durability during and after expansion and allowing flex-engagement of the lip-and-inlet contours to provide a reliable seal of the expansion bladder or bounding wall. The valve member including a peripheral sealing flange extended radially therefrom for attaching to the bladder or bounding wall.

The above and other aspects, features and advantages of the present invention will become apparent from the following description read in conjunction with the accompanying drawings, in which like reference numerals designate the same elements.

BRIEF DESCRIPTION OF THE DRAWINGS

A further understanding of the present invention can be obtained by reference to a preferred embodiment set forth in the illustrations of the accompanying drawings. Although the illustrated preferred embodiment is merely exemplary of methods, structures and compositions for carrying out the present invention, both the organization and method of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the various following drawings in which.

DETAILED DESCRIPTION OF THE PREFERRED EMBODIMENTS

As required, a detailed illustrative embodiment of the present invention is disclosed herein. However, techniques, systems, compositions and operating structures in accordance with the present invention may be embodied in a wide variety of sizes, shapes, forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Reference will now be made in detail to one or more embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, below, etc., or motional terms, such as forward, back, sideways, transverse, etc. may be used with respect to the drawings. These and similar directional terms should not be construed to limit the scope of the invention in any manner.

Figure 1:
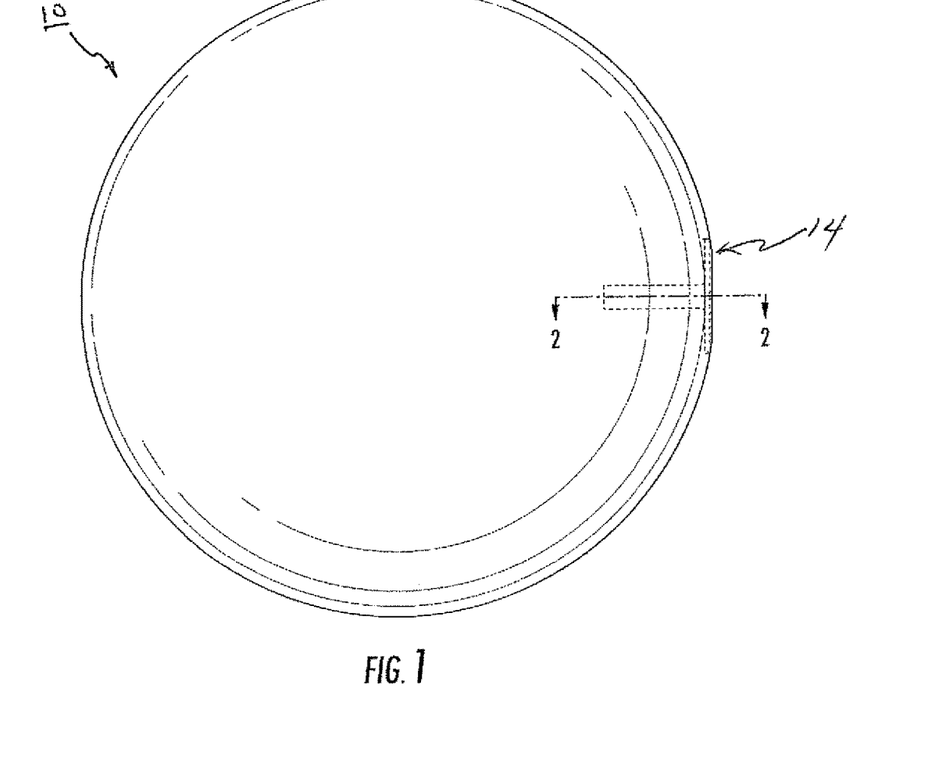
FIG. 1 shows a front perspective view of one alternative fluid expansion valve assembly integrated with an expansion bladder member in accordance with a first embodiment of the invention.
Figure 2:
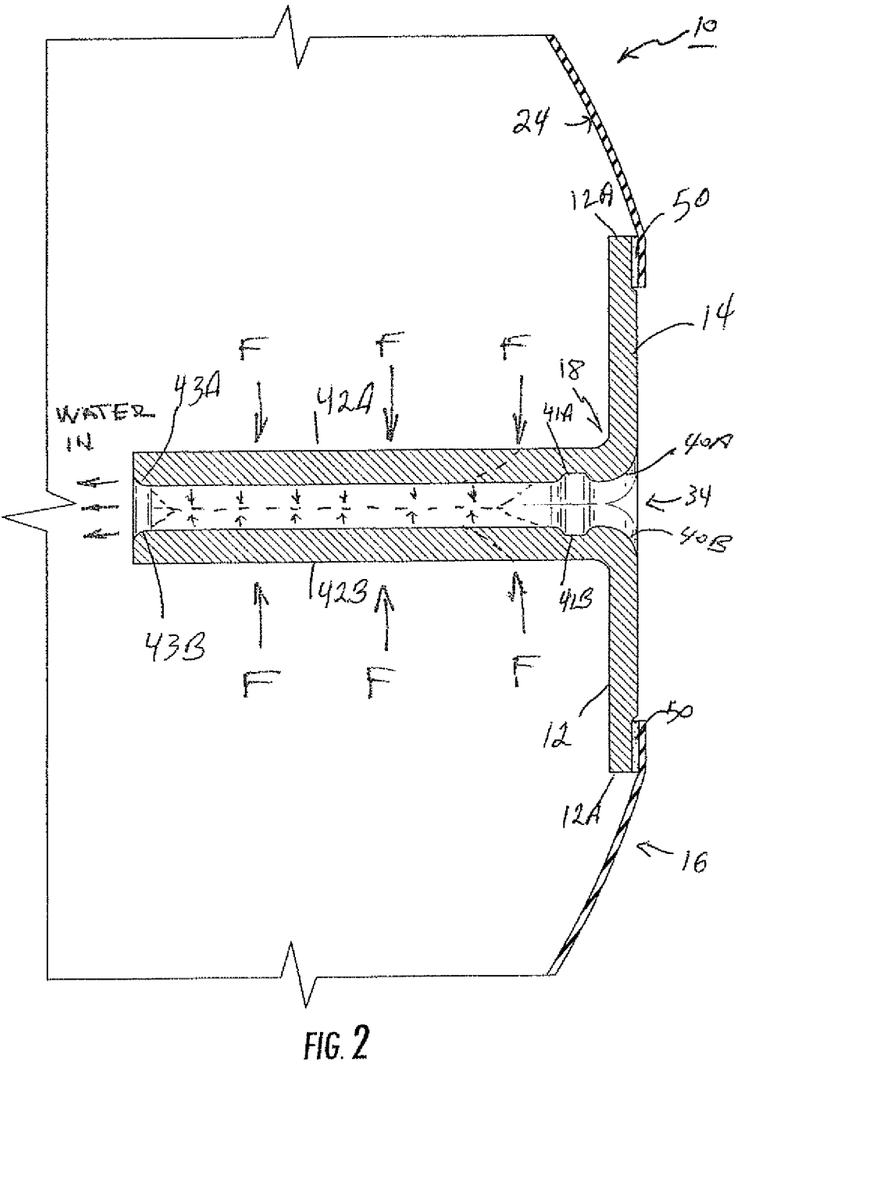
FIG. 2 shows a partial sectional cutaway sectional view along section 2-2 in FIG. 1 providing a close-view of the fluid valve assembly in cross-section.
Figure 3:
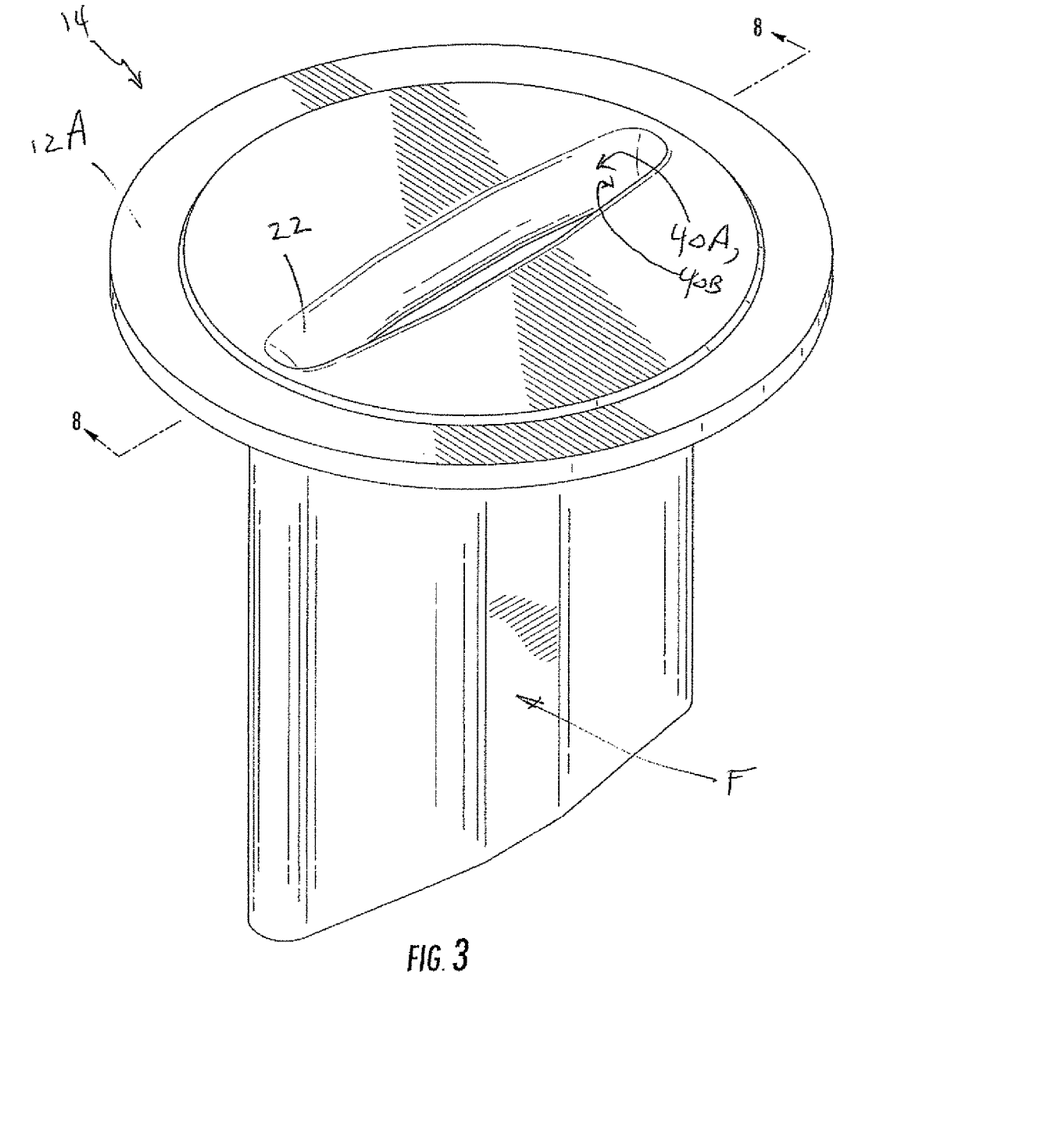
FIG. 3 shows a perspective view of the fluid valve assembly from FIG. 2 in a pre-integration stage before assembly with the expansion bladder member illustrating the inner details of the valve assembly according to the first embodiment of the invention.
Figure 4:
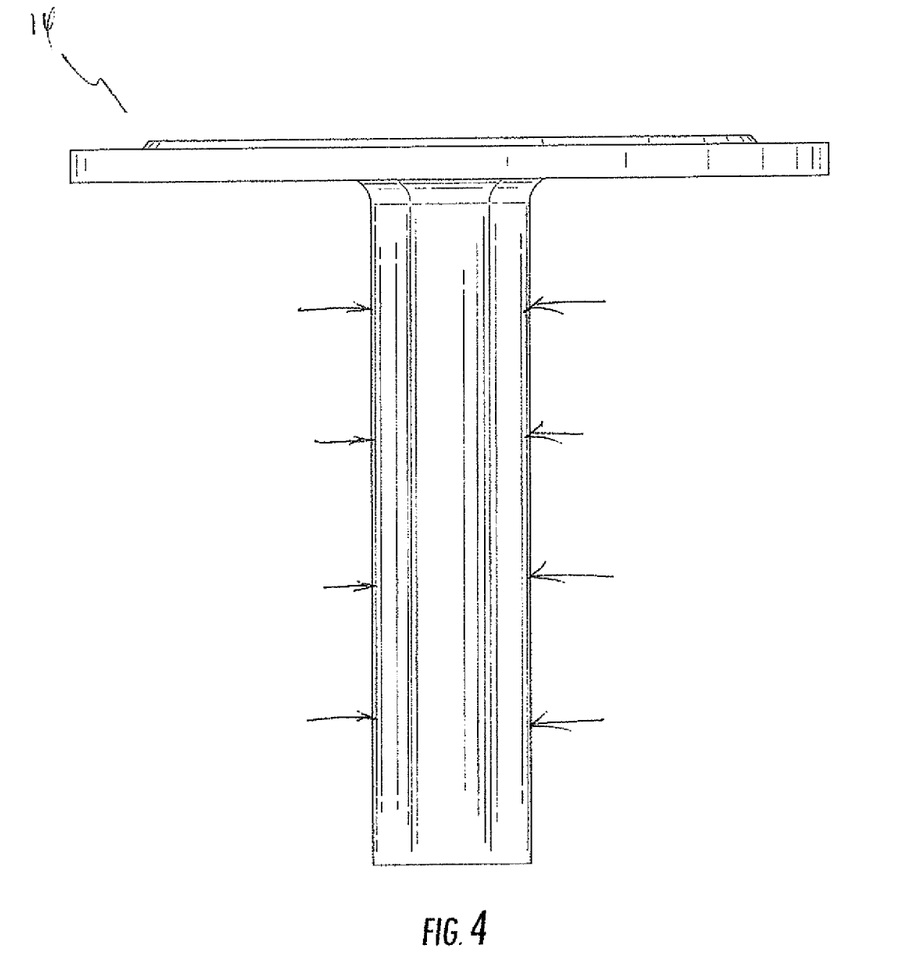
FIG. 4 shows a front elevation view of the valve in FIG. 3.
Figure 5:
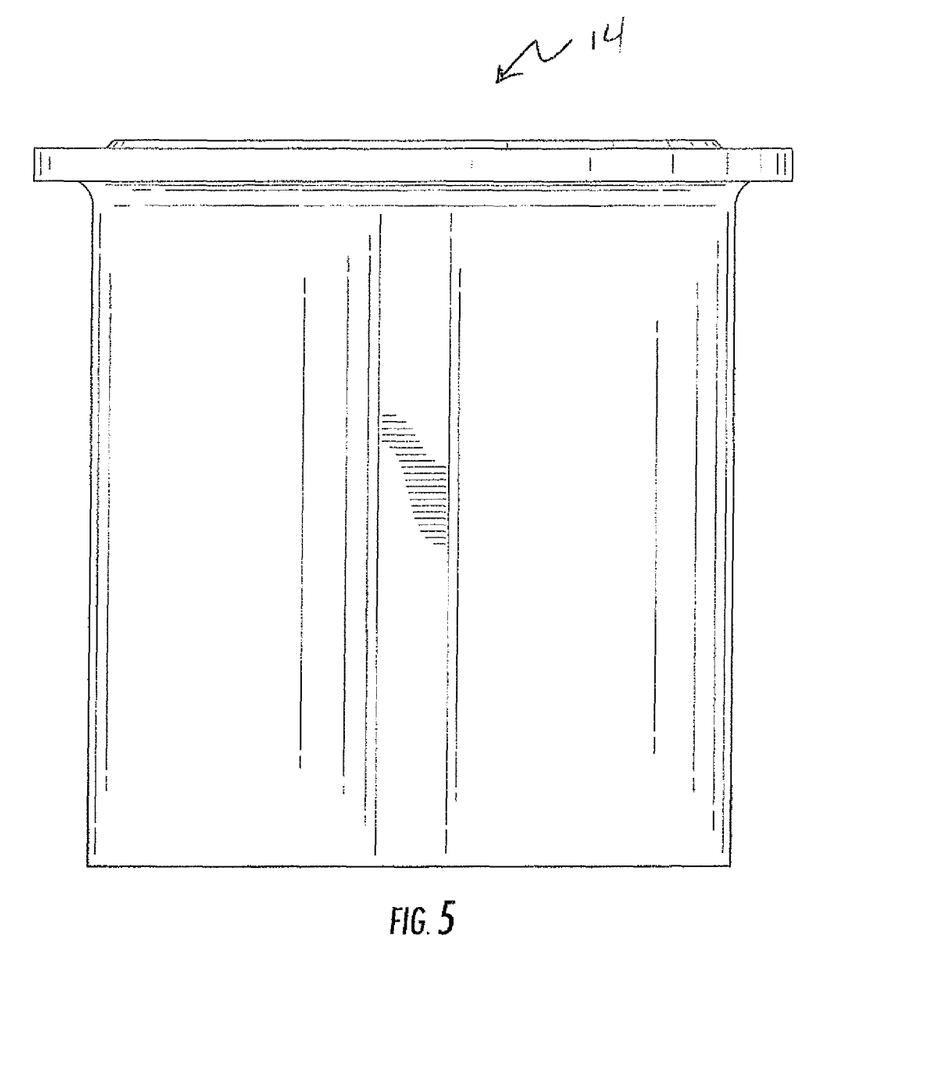
FIG. 5 shows a side elevation view of the valve in FIG. 3.
Figure 6:
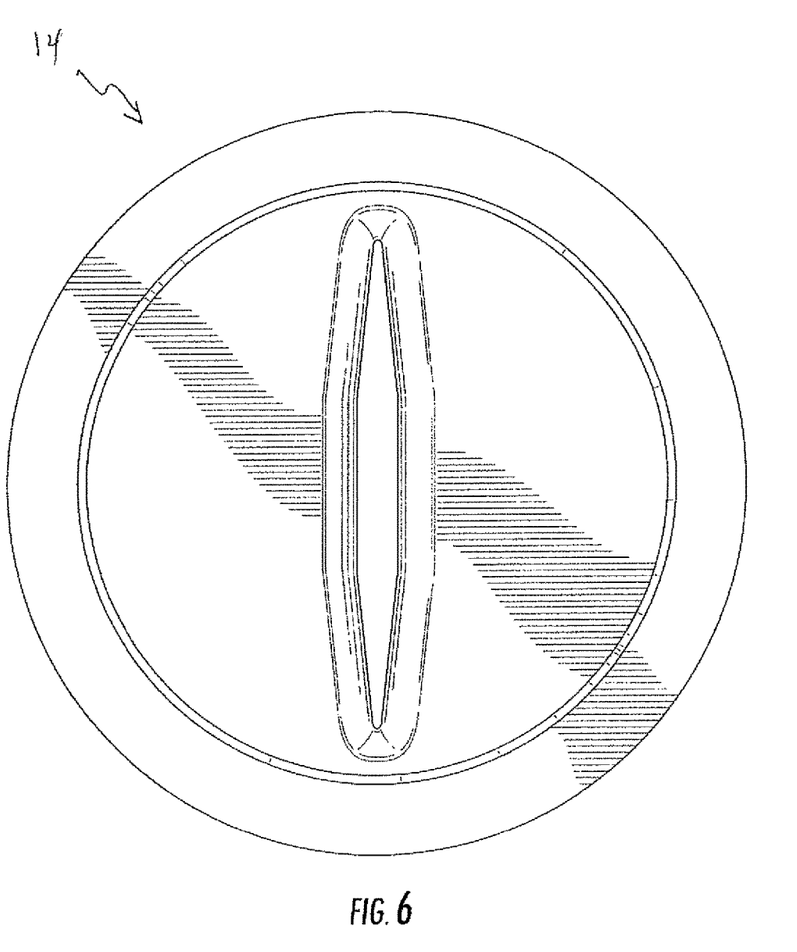
FIG. 6 shows a top plan view of the valve in FIG. 3.
Figure 7:
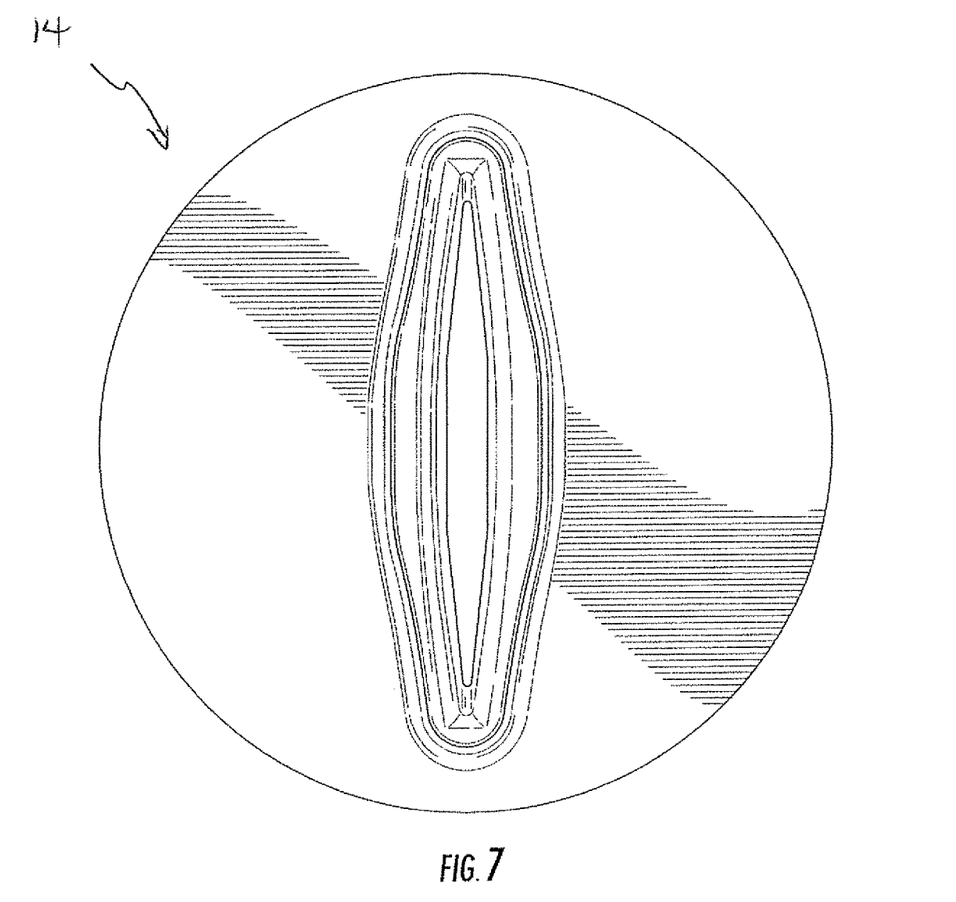
FIG. 7 shows a bottom plan view of the valve in FIG. 3, wherein the inner lip and inlet contours are appreciated.

Referring first to FIGS. 1-2, respectively, shown are a perspective view of a thermoplastic expansion bladder 10 having a fluid valve assembly 14 integrated with the expansion bladder 10 and having an inner surface 24, and a partial top cutaway perspective plan view of a portion the volume or expansion bladder 10 shown in FIG. 1 showing the fluid valve assembly 14 according to a preferred embodiment of the invention. As will be described in more detail below, the present invention provides a fluid valve assembly 14 for expandable bodies 10 typically made from thermoplastic rubber material and the like which will exhibit significantly increased strength and durability during inflation and while inflated, especially at and around the interface between the fluid valve assembly 14 and the bounding wall 16 of the expandable body 10. The fluid valve assembly 14 in accordance with the present invention comprises a valve body member 18 including a peripheral sealing flange 12 extended radially therefrom, such as the upper end thereof, for attaching to the inner or outer portion of bladder or bounding wall 16 of expandable body 10.

The bounding wall or bladder 16 of the expandable body 10 may be made from thermoplastic polyurethane elastomer (TPE) materials or thermoplastic rubber (TPR) materials, such as polyester-based or polyether-based polyurethane, polyvinyls, polyesters and polyethers, etc., which contribute a desired property, e.g. air retention, abrasion resistance, etc. Kraton is one such preferred material for use as the bladder or bounding wall 16 of the inflatable body in accordance with the present invention. Other high-expansion materials may be employed without departing from the scope and spirit of the present invention. These materials may be mixed with colorants or fillers to adjust color (e.g., to make a big character figure (Sponge Bob®) or colored like a 'Super-Man' cape) also without departing from the scope and spirit of the present invention.

As shown in FIGS. 3-9, shown is the valve assembly 14 of the invention illustrating the inner details of the fluid valve member 18 and radial flange 12 according to a preferred embodiment of the invention. As shown, the fluid valve member 18 includes a central bore 34 formed therein as a slot formed as a bounded opening having an interior contour as will be discussed. A central opening 22 communicating with the bore 34 of the valve member 18 has first side and second side rounded outer opening lip contours 40A, 40B and corresponding first and second side inlet contours 41A, 41B that extend along central bore 34 along first and second side walls 42A, 42B until reaching related and corresponding first and second end curve contours 43A, 43B. The outer contours 40A, 40B are formed in a convex outwardly curving arc for ease of insertion of a fluid provider such as a hose or faucet opening. Immediately adjacent outer contours 40A, 40B, concave inwardly curving inlet contours 41A, 41B serve several purposes, including thinning the side walls 42A, 42B and allowing a maximum of flexibility of fluid valve assembly 14 under compaction and expansion, while also allowing any expansion force F (See FIG. 2) applied to the external portion of central bore 34 to urge and pressingly seal extended side walls 42A, 42B together to provide a complete fluid seal there alone. In this manner those of skill in the art will recognize that concave inlet contours 41A, 41B serve as stress flexing concentrators so as to allow easy closure of extended side walls 42A, 42B under internal fluid pressure force F. Additionally, in view of the flexible and elongate nature of extending side walls, and the acute inner angles joining the inner faces thereof (as can be appreciated in FIGS. 6 and 6) minimal force is needed to completely close inner bore 34 and urge side walls 42A/B together as shown in dashed lines in FIG. 2.

Figure 8:
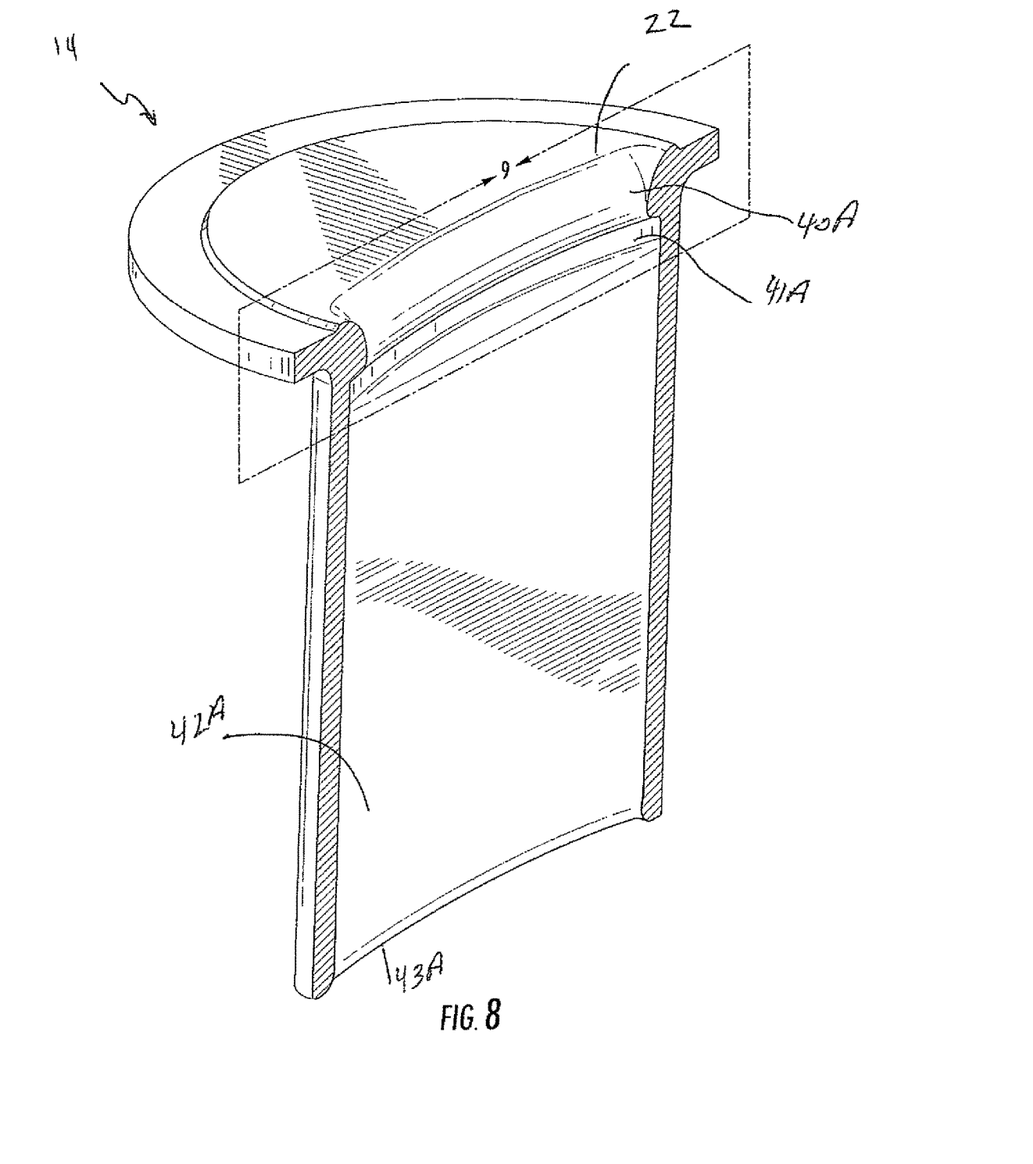
FIG. 8 shows a partial perspective sectional view along section 8-8 in FIG. 3 noting the inner contours of the fluid valve.
Figure 9:
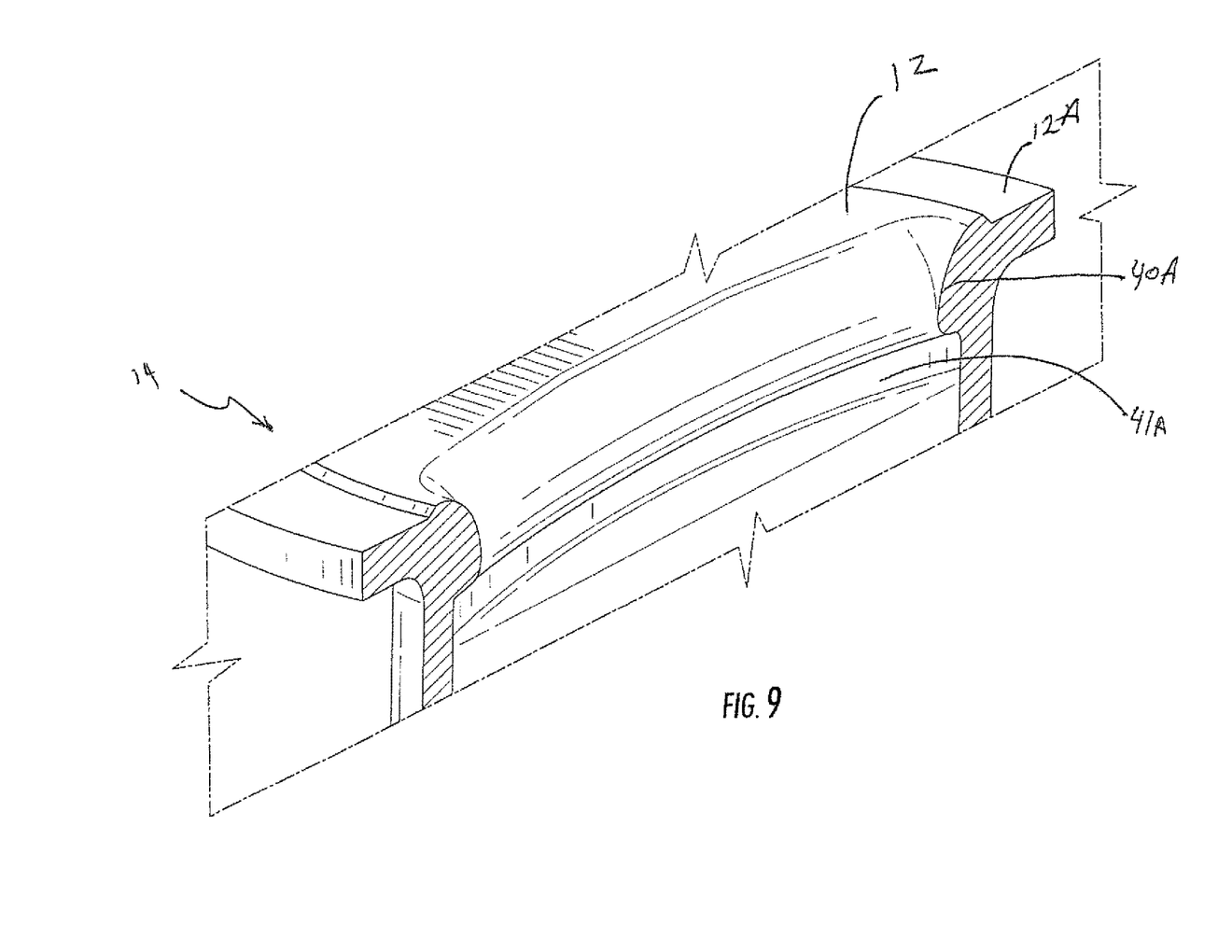
FIG. 9 is a close up partial perspective view of the portion 9 in FIG. 8 noting the inner contours of the fluid valve.

Simultaneously, the rounded end curves 43A, 43B allow easy removal of interior fluid (water) by inserting a simple rounded member along inner bore so that water flows over the rounded end curves smoothly and without undue cavitations for speedy draining of the thermoplastic expansion member 10 between uses.

As will be additionally understood, around the outer portion of radial flange 12, which will be understood to be of any size and shape, not necessarily round, is formed a reduced thickness region 12A for ease with bonding to the inner bounding wall 16 of bladder as shown in FIG. 2 with regions 50. Regions 50 may be shown as integrated matrix of the similar materials in expandable member 10 and fluid valve assembly 14 which may occur through the use of any form of securement known in the art, including chemical bonding, adhesive, thermal, ultrasonic, laser, co-forming, or otherwise without limitation. Regions 50 may be integral in structure and chemical composition to fluid valve assembly 14 and expansion member 10, thereby ensuring a similar expansion coefficient, thermal coefficient, and in all other ways being an integral formation thereof.

Optimally, such improvement in design and shape is on the order of 1000-8000 times on the stress strength and/or durability of the fluid valve/bounding wall interface during fluid expansion in a three-dimensional direction (stretching, thinning, and drawing radial flange 12 and bounding wall 16 under stress. As this causes substantial volumetric expansion stress at the valve site (which itself may expand differently) selection of the inventive shape and proper materials is essential to suitable function.

It is preferable that the fluid valve assembly 18 and the expansion member 10 be of the same TPR material.

In operation, an external fluid conduit such as a hose, fluid pump, or faucet coupling (not shown) is engageable through the central bore 34 of the valve member 14 for expanding the bladder 10. After the bladder 16 has been filled and when the filling coupling (not shown) has been disengaged from the central bore 34, the pressurized fluid in the bladder 10 will exert force F on either side of extended side walls 42A, 42B and create a complete seal, simultaneously, the acute angle side walls joining extending side walls 42A, 42B will flex as hinges (e.g., allowing the side walls to seal together. Accordingly, the valve assembly 18 in accordance with the present invention includes a structure, or slot valve, configured such that the fluid passage will be substantially, if not completely, blocked upon removal of the filling coupling from the fluid valve assembly 18, and to ensure that the fluid volume with the bladder or bounding wall 16 cannot escape through the air valve assembly 18. In other words, valve member 18 functions as a one-way fluid valve, until it is forced open again by insertion of a draining coupling (not shown).

Preferably, valve assembly 18 is formed using injection molding, although other known techniques may be employed.

During an exemplary thermal sealing flange region 12A is thermally sealed with the region of the bounded wall of 16 of expansion member 10. Because the valve member 18 is preferably made from the same material as the expansion body 10, the thermal seal created therebetween yields a significantly great strength than if the materials were not the same. It will be understood, that the proposed method discuss herein, of securing a valve assembly with an expandable bladder, may be used similarly with the alternative embodiments without departing from the scope and spirit of the present invention.

While a variety of plastic materials may be used with the present invention, as discussed herein, it has been found that preferred materials for use as the valve 14 and the inflatable body 10 to yield the greatest expandability while maintaining the integrity of the seal between the valve 14 and the bounded opening of the expansion body 10 include plastics such as Mediprene™ 500000M (manufactured by the Elasto Division of Hexpol), Dryflex™ 500040 (available through Ricky Engineering Plastics Co., Ltd, Dongguan City, China), and Versaflex™ CL2003X (manufactured by Poly-One Americas of Avon Lake, Ohio). Testing has shown that, being perfectly elastic (meaning greatest elasticity, retains elasticity, durable elasticity in all directions, remains elastic after thermal bonding), Mediprene™ is the material providing the greatest elasticity while maintaining the thermal seal. While the Dryflex™ and Versaflex™ materials allow for significant elasticity and expansion, each is not perfectly elastic and is more limited than the Mediprene™. It is also noted that in one preferred embodiment the bladder is constructed from each of the above-noted preferred materials, particularly Mediprene™ 500000M It is noted that the further specific material details of these preferred materials are available on the internet, and via material data safety sheets and technical data sheets for each item provided by the manufacturer, and therefore that this material is available to one of skill in the art and is incorporated herein fully by reference.

In accordance with the present invention, a variety of bonding techniques may be employed to secure the valve assembly 14 to the bounded walls of member 10. Examples of these bonding techniques include thermal bonding, adhesive bonding, and the use of a bonding element. The specific bonding technique utilized to secure the valve to the bladder at least partially depends upon factors that include the materials forming each of the valve and the bladder. More particularly, the bonding technique utilized to secure the valve to the bladder may be selected based upon the materials forming the flange and an outer surface of the bladder. It has been additional and alternatively determined, that following such bonding along flange region 12A, that the a strength of the bond may exhibit greater strength when both flange 12 and the inner/outer surface of bladder 10 are formed from compatible (i.e., readily thermal bondable) thermoplastic polymer materials.

As utilized herein, the term "thermal bonding" or variants thereof is defined as a securing technique between two elements that involves a softening or melting of a thermoplastic polymer material within at least one of the elements such that the materials of the elements are secured to each other when cooled. As examples, thermal bonding may involve (i) the melting or softening of two elements incorporating thermoplastic polymer materials such that the thermoplastic polymer materials intermingle with each other in an integrated and monolithic manner (e.g., diffuse across a boundary layer between the thermoplastic polymer materials) and are secured together when cooled; (ii) the melting or softening of a first element incorporating a thermoplastic polymer material such that the thermoplastic polymer material extends into or infiltrates the structure of a second element to secure the elements together when cooled; and (iii) the melting or softening of a first element incorporating a thermoplastic polymer material such that the thermoplastic polymer material extends into or infiltrates crevices or cavities formed in a second element to secure the elements together when cooled and becomes unitary therewith. Therefore, thermal bonding may occur when (i) both of flange 12 and the inner/outer surface of bladder or bounding wall 16 include thermoplastic polymer materials; or (ii) only one of flange 12 and the inner/outer surface of bladder or bounding wall 16 includes a thermoplastic polymer material. Although thermal bonding may be performed utilizing conduction as the manner in which heat is applied to the elements, thermal bonding also includes the use of radio frequency energy (i.e., radio-frequency bonding) and high frequency sound (i.e., sonic bonding), for example. Additionally, thermal bonding does not generally involve the use of adhesives, but involves directly bonding elements to each other with heat. In some situations, however, adhesives may be utilized to supplement the thermal bond joining flange 12 and bladder or bounding wall 16.

Suitable materials for bladder or bounding wall 16 include a variety of thermoset and thermoplastic polymer materials. An advantage of thermoplastic polymer materials is that they may be molded (e.g., thermoformed) to impart the shape of each bladder element. Moreover, thermoplastic polymer materials may be thermal bonded to each other to form seams. Examples of polymer materials that may be utilized for bladder or bounding wall 16 include any of the following: polyurethane, urethane, polyester, polyester polyurethane, polyether, polyether polyurethane, latex, polycaprolactone, polyoxypropylene, polycarbonate macroglycol, and mixtures thereof. Any one of the materials noted above may form bladder or bounding wall 16.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that such embodiments are merely exemplary and that the invention is not limited to those precise embodiments, and that various changes, modifications, and adaptations may be effected therein by one skilled in the art without departing from the scope or spirit of the invention as defined in the appended claims. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. An expandable body system, comprising:
   an expandable body;
   a fluid valve assembly permanently secured to said expandable body, said fluid valve assembly comprising:
   a generally flexible body member having an inner and an outer surface and an inner bore therethrough;
   a tubular projection extending from one end of said flexible body member on a first side and a pair of extending side walls including a first extending side wall and a second extending side wall extending away from said projection on a distal side thereof;
   said inner bore having an elongate cross section with said first extending side wall and said second extending side wall therealong and acute angles joining each respective first and second extending side walls;
   each said first and second extending side walls having a respective first and second convex lip contour having an arcuate surface;
   a first and second concave inlet contours extending inwardly from each respective said convex lip contour;
   a first thickness of said first and second extending side walls along said first and second concave inlet contours being less than a second thickness of respective said first and second convex lip contours, the inlet contours being disposed along a length of said inner bore; and
   a generally radially arranged region of said of flexible body member distal said inner bore being thermally bonded to a surface of said expandable body proximate an opening in said expandable body so as to seal said expandable body.

2. The fluid valve assembly according to claim 1, wherein:
   at least one of said expandable body and said flexible body member is made from a material selected from the group consisting of: thermoplastic elastomer (TPE), thermoplastic rubber (TPR), polyester-based polyurethane, polyether-based polyurethane, polyvinyls, polyesters, polyethers, rubber, latex, nylon, vinyl, polychloroprene, synthetic fabric, synthetic rubber, and natural rubber.

3. The fluid valve assembly, according to claim 1, wherein: said fluid valve assembly is substantially formed from a same material as said expandable body.

4. The fluid valve assembly, according to claim 1, wherein:
   a flange region of said flexible body member is affixed to said expandable body using a bonding technique selected from the group consisting of adhesive bonding, thermal bonding, element or tie bonding, and co-bonding.

5. The fluid valve assembly, according to claim 1, wherein: said flexible body member is made using injection molding.

6. The fluid valve assembly according to claim 1, wherein said generally flexible body member has a ring member extending from the inner surface bounding said projection at a fixed distance therefrom.

7. An expandable body system, comprising:
   an expandable body;
   a fluid valve assembly permanently secured to said expandable body, said fluid valve assembly comprising:

a generally flexible body member having an inner and an outer surface, said body member made from a thermoplastic elastomer;

an inner bore formed as a slot valve having opposed first and second side walls joined at acute angles therebetween, the inner bore being transitionable between closed condition and an open condition;

wherein said opposed first and second side walls are substantially flat; and an opening of said first and second side wall is formed by opposed convex outer lip contour arcs on outer surface thereof and immediately adjacent inwardly therefrom are formed first and second opposed concave inlet contours, the inlet contours being oriented along a length of said inner bore.

8. The fluid valve assembly according to claim 7, wherein said expandable body is substantially formed from a same material as said fluid valve assembly.

9. The fluid valve assembly according to claim 8, wherein: a flange region of said flexible body member is affixed to said expandable body using a bonding technique selected from the group consisting of adhesive bonding, thermal bonding, element or tie bonding, and co-bonding.

* * * * *